June 14, 1966      E. A. LINDGREN      3,256,384

SLIDING DOOR FOR A SHIELDING ENCLOSURE

Original Filed Feb. 12, 1962      3 Sheets-Sheet 1

INVENTOR:
ERIK A. LINDGREN
BY
ATT'Y

June 14, 1966  E. A. LINDGREN  3,256,384
SLIDING DOOR FOR A SHIELDING ENCLOSURE
Original Filed Feb. 12, 1962  3 Sheets-Sheet 2

INVENTOR:
ERIK A. LINDGREN
BY
ATT'Y

June 14, 1966   E. A. LINDGREN   3,256,384
SLIDING DOOR FOR A SHIELDING ENCLOSURE
Original Filed Feb. 12, 1962   3 Sheets-Sheet 3
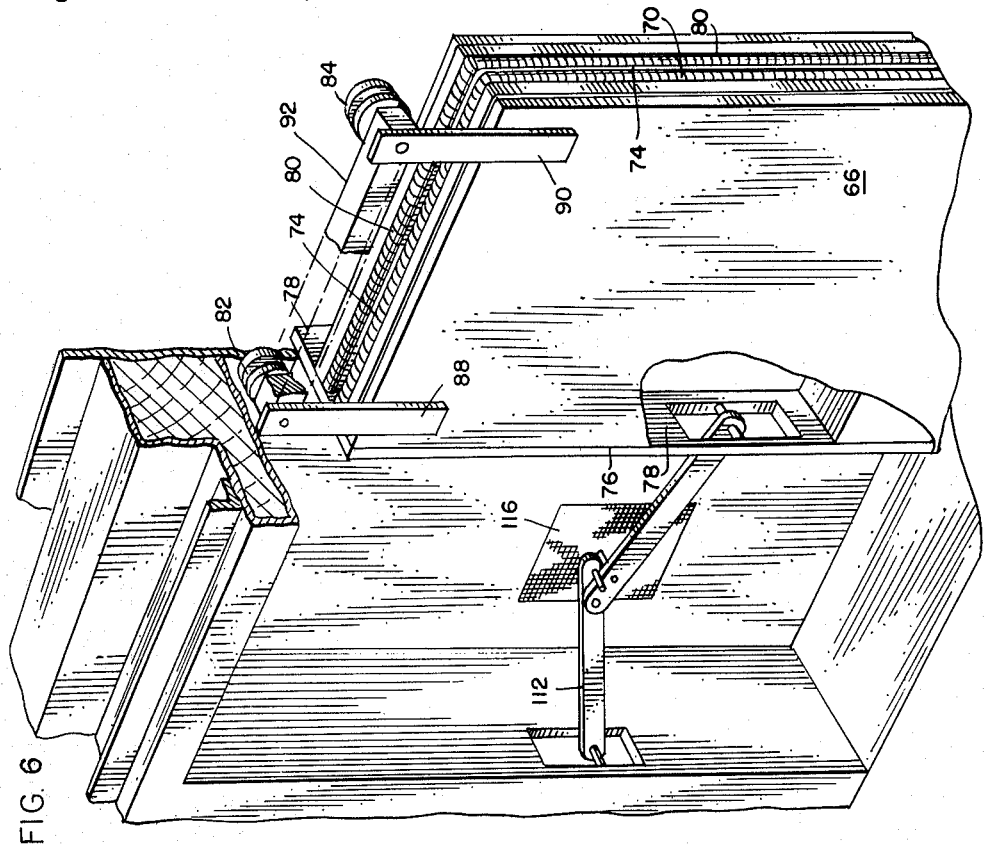
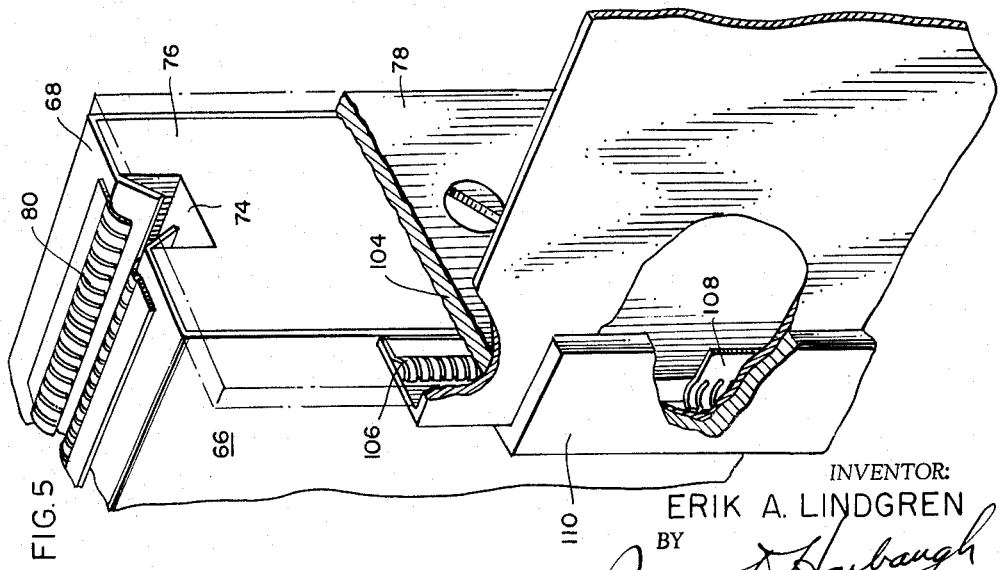
INVENTOR:
ERIK A. LINDGREN
BY
ATT'Y

United States Patent Office 3,256,384
Patented June 14, 1966

3,256,384
SLIDING DOOR FOR A SHIELDING ENCLOSURE
Erik A. Lindgren, 4515 N. Ravenswood Ave.,
Chicago, Ill.
Original application Feb. 12, 1962, Ser. No. 172,670.
Divided and this application Aug. 7, 1963, Ser. No. 300,436
5 Claims. (Cl. 174—35)

This application is a division of application Serial No. 172,670, filed February 12, 1962, now abandoned.

This invention relates in general to an electrically shielded enclosure often referred to as an isolation room for protection from high frequency wave emanations and magnetic fields and relates in particular to the panel configuration and access door construction carried by a single panel whereby the entire isolation room may be readily assembled and disassembled with a minimum of effort without loss of the desired shielding effectiveness.

Shielding efficiency is related to conductivity and nonpermeability and it is known that continuous electrical conductivity between contiguous points in a shielding element affords a pronounced efficiency shield in the intermediate and lower wave bands.

Isolation rooms are primarily used in laboratories and in other places where various types of tests are performed upon electrical equipment, for example, radio interference measurements, radio frequency calibrations, testing equipment for measuring minute voltages and testing of various other electronic devices and appliances. The purpose of such enclosures or isolation rooms is to intercept and dissipate stray electromagnetic and electrostatic waves which would otherwise be the cause of serious disruption of the testing of the devices.

In the past, isolation rooms have taken one of three standard forms. Either as a single-shielded structure wherein a single sheet of material having a substantially planar surface is utilized for the interference dissipation; as a double-shielded enclosure wherein a pair of shielded sheets of material are spaced apart and insulated from one another for dissipation of higher wave emanations; and as the cell-type structure wherein double-shielded structures are conductively coupled to one another to form a continuous surface for the desired interference dissipation.

Formation of an isolation room from a plurality of prefabricated panels is well known in the art as well as the formation of an isolation room of the single-shield type.

In recognition of the desired objects and factors of an isolation room, it is the principal object of this invention to provide an improved electrically isolated room having a sliding door mounted thereon having a safety feature of being opened either from within the room or from outside the room.

The features of the present invention which are believed to be novel are set forth with particularity in the appended claims. The geometrical relationship and the manner of formation of the invention, together with further objects and advantages thereof, may best be understood by reference to the following description taken in connection with the accompanying drawings in which, like reference numerals identify like elements, and in which:

FIG. 5 is a fragmentary partially cut away view in front perspective showing the relationship of the contact plate secured to one end of the sliding door in relationship to the adjacent panel members; and FIG. 6 is an exploded fragmentary partially cut away view in front perspective illustrating the relationship of a closing mechanism for securing the door in a closed electrically contacting position.

Referring now to FIGS. 1, 2, 3, 4, 5 and 6, an entrance door 66 is illustrated in conjunction with abutting sealing members about its periphery to complete total isolation of the room when the door is in the closed position.

Figure 1:
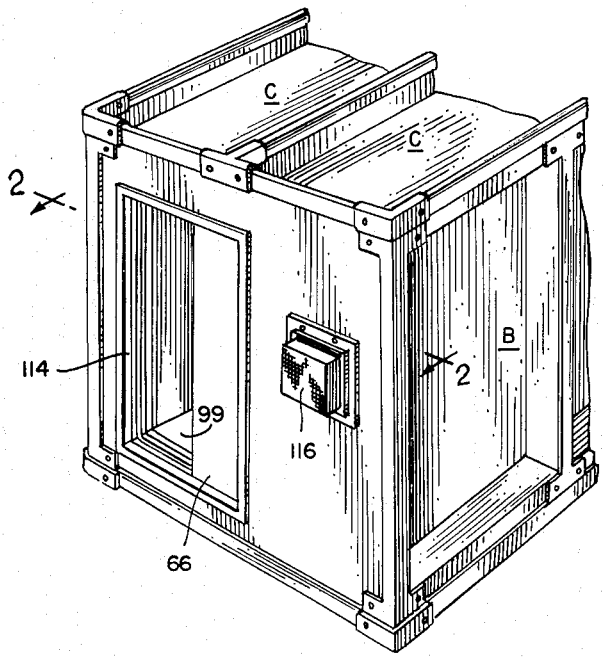
FIG. 1 is a fragmentary perspective view in front elevation showing the relationship of an entrance door in one of the panels of an isolation room.

As shown in FIG. 1, the entrance door 66 is of the sliding variety and is preferably positioned adjacent one end of a side wall of the isolation room. The door is designed to slide within the room and when in the closed position to make conductive sealing contact about its marginal edges with the adjacent wall members.

The door is preferably of rectangular frame structure having shielding material disposed entirely over the outer surfaces. Three of the marginal edges of the door, top edge 68, side edge 70 and bottom edge 72, have a groove 74 formed in contiguous relationship therein and the peripheral edges of the shielding material disposed over the frame member is received within the groove as best seen in FIG. 5. The other marginal side edge 76 of the door has a contact plate 78, substantially wider than the thickness of the door, secured thereto in a manner to permit a portion to extend outwardly past one side of the door.

Still referring to FIG. 5, contact fingers 80, preferably formed from spring bronze, are secured to the marginal edges of the door on both sides of the groove 74 with the free ends of the fingers extending into the groove.

Figure 2:
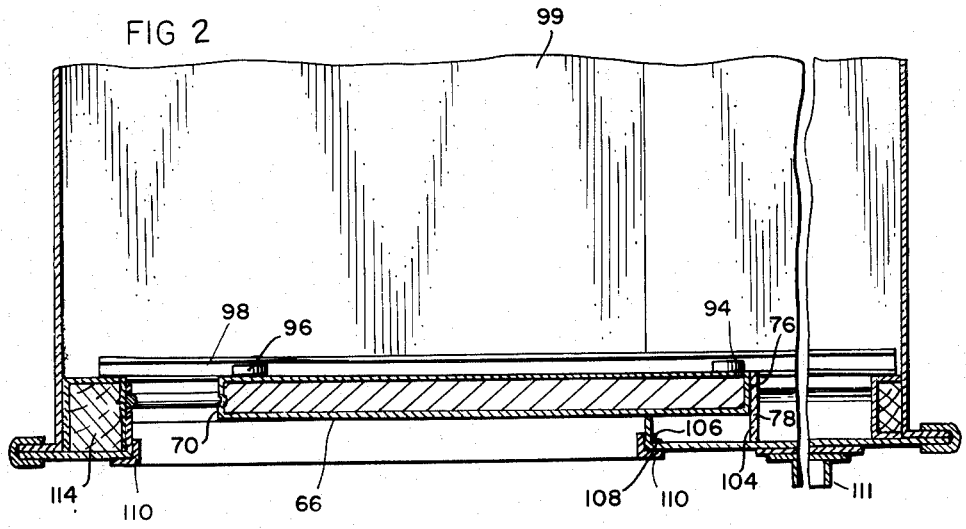
FIG. 2 is a fragmentary partially sectioned view taken along the line 2—2 of FIG. 1 illustrating the relationship of the sliding entrance door in respect to the isolation room.

The door is preferably supported and retained in sliding relationship with the side walls of the room by a pair of roller members 82 and 84 secured to the door and riding or seating on an angle member 86 secured to the upper frame structure of the side of the room. As best seen in FIG. 2, the rollers 82 and 84 are secured in position above the door by uprights 88 and 90 with a crossbar 92 disposed therebetween to add stability to the mating, sliding retention of the door.

To aid in holding the door in perfect alignment at all times, an additional pair of wheels 94 and 96 are preferably secured in rotative relationship and spaced apart along the bottom of the door. The wheels 94 and 96 ride in a channel member 98 positioned in the floor 99 of the room, in juxtaposition with angle member 86 whereby the door is held in perfect alignment.

Figure 3:
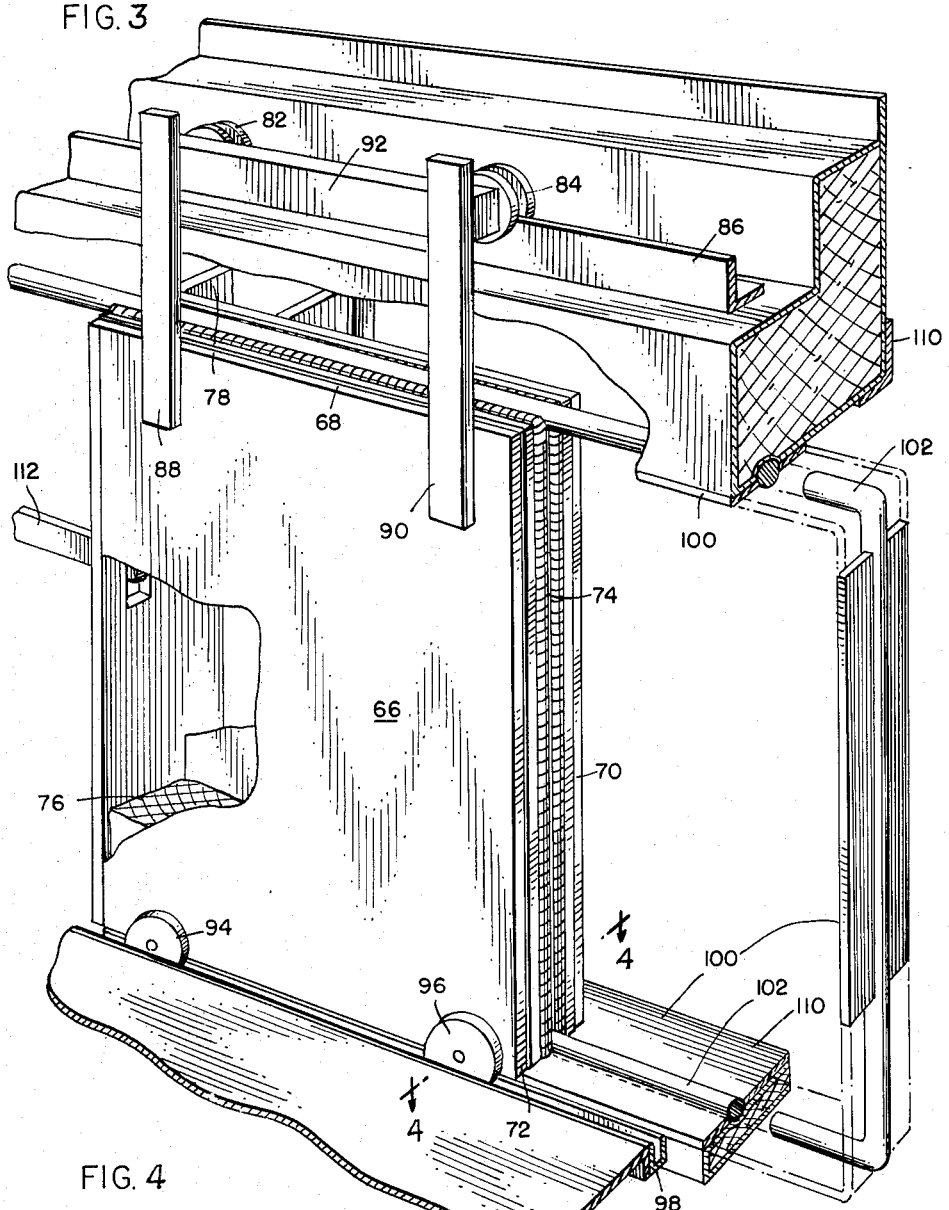
FIG. 3 is a fragmentary partially cut away view in front perspective viewing the sliding door from within the isolation room.
Figure 4:
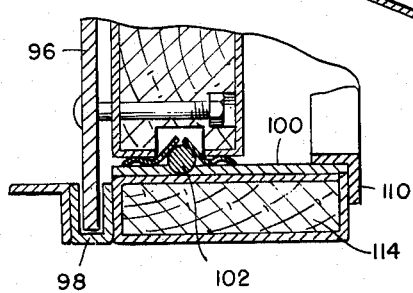
FIG. 4 is a fragmentary partially sectioned view taken along the line 4—4 of FIG. 3 denoting the relationship of the guiding members and contact relationship along the lower surface of the sliding door.

As seen in FIG. 3, a contact plate 100 is secured to the mating surface of the door opening and provides a rod 102 essentially secured thereon for partial receipt into the groove 74 when the door is moved to the closed position.

As the rod 102 enters the groove 74, contact is made with the spring fingers 80 under spring pressure. Further, contact is made as the contact plate 100 abuts the marginal edges of the door and the exposed portion of the spring fingers 80.

The portion of rod 102, riding in the groove 74 in the bottom wall 72, further aids the door alignment in conjunction with the wheels 94 and 96 in channel 98 and the rollers 82 and 84 on the angle member 86.

It now being readily understood how a positive electrical conductive contact is attained on three of the marginal side edges of the door, attention is directed to FIG. 5 which illustrates the relationship of the abutting surfaces forming the desired electrical conductive seal on the fourth side or marginal edge of the door when in the closed position.

The contact plate 78, as previously explained, is secured to the marginal side edge 76 of the door 66 and provides an outwardly extending portion 104 from one side thereof. Extended portion 104 abuts against a series of contact fingers 106 secured to the inner side of the adjacent doorway entrance wall. Further, another series of spring fingers 108 are secured on the inner surface of the adjacent room wall, next to the spring fingers 106, so that, when the door is moved to the closed position, the flat surface of the extended portion 104 of plate 78 will contact the spring fingers 106 with the end or edge of portion 104 contacting the spring fingers 108. It being understood that spring fingers 106 and 108 extend the entire height of the door and are entirely hidden from view from the outside of the room.

A reinforcing right angle member 110 is preferably secured about the outer peripheral edge of the doorway opening to increase rigidity of the room.

To insure a continual, positive total conductive contact about the periphery of the door, it is further desirable to fixedly secure the door in the closed position once the operating personnel are inside the isolation room. Referring now specifically to FIG. 6, a simple pivotal locking linkage 112 is positioned between the marginal edge 76 of the door 66 and an upright support 114. When linkage 112 is locked in the extended position, the door is forced into and held in conductive sealing contact; the rod 102 bearing against the spring fingers 80 in the groove 74 and the extended portion 104 of the contact plate 78 in contact with the spring fingers 106 and 108.

Since the door 66 is locked from within, entrance to the room is virtually impossible from without. To provide maximum safety for personnel within the room, permitting access to the room from the outside, a pivotally secured air inlet filter 116, as seen in FIG. 1, is positioned in the side wall of the room in juxtaposition with the pivotal locking linkage 112. Thus, if it should become necessary to gain entrance into the room from without, due to incapacity of the personnel within, the inlet air filter 116 may be loosened and pivoted to the open position to permit physical access to the linkage 112 to open the door.

The air filter is preferably pivotally mounted and sealed at its periphery when in the closed position in a manner shown by my Patent No. 2,853,541, reference being made thereto which discloses a plurality of spring fingers, similar to spring fingers 106 and 108, in abutting relationship about the periphery to attain the desired seal.

The foregoing is considered as illustrative only of the principles of the subject invention. Further, since numerous modifications and changes will readily occur to those skilled in the art, it is not desired to limit the invention to the exact construction and formation shown and described, and accordingly, all suitable modifications and equivalents may be resorted to, falling within the scope of the invention as claimed.

What is claimed is:

1. In combination with a plurality of preformed electrically conductive panels forming an electrical isolation room,
   an entrance door slidably retained in one side wall of the room comprising a rectangular frame and shielding material supported on opposite sides thereof,
   a groove centrally formed in each of three of the marginal edges of said frame,
   contact spring fingers secured in pairs to the marginal edges having the grooves therein in electrical contact with the respective sides of shielding material with the ends of said fingers extending into said groove from opposite sides thereof,
   a contact plate secured to the fourth marginal edge of the door in relationship electrically bridging the respective sides of the shielding material,
   a portion of said contact plate extending past one of the sides of the door,
   contact means secured to the side wall of the room to engage said pairs of contact fingers in said grooves,
   guide members secured to the door in co-operation with the side wall of the room to slidably retain the door in position
   and direct said contact means between said pairs of spring fingers,
   electrically conductive means resiliently interengaging one of said panels and said contact plate electrically,
   said contact means and contact plate electrically sealing the periphery of the door with the side wall when the door is in the closed position.

2. In combination with a plurality of preformed metallic panels forming an electrical isolation room,
   an entrance door slidably retained in one side wall of the room comprising a rectangular frame and metallic shielding material supported on opposite sides thereof,
   a groove centrally formed in each of three of the marginal edges of said frame between the edges of said shielding material with the periphery of the shielding material disposed in the grooves,
   contact spring fingers secured to the marginal edges in electrical conductive contact therewith on opposite sides of the grooves in pairs, with the ends of said fingers extending into the groove,
   a contact plate secured to the fourth marginal edge of the door, with a portion of said contact plate extending past the surface of the door,
   contact members secured on the side wall of the room to engage said pairs of contact fingers in electrically bridging contact therewith,
   electrically conductive resilient means on one of said panels contacting the contact plate to electrically seal the periphery of the door with the side wall when the door is in the closed position,
   roller members secured to the upper portion of the door in co-operation with a guiding member on the side wall of the room to slidably retain the door in position with said contact members and spring fingers in co-operating relationship.

3. In combination with a plurality of preformed electrically conductive panels forming an electrical isolation room,
   one side wall of the room having a door opening defined in part by a vertical contact plate,
   an entrance door slidably retained in the one side wall comprising a rectangular frame and shielding material supported thereon on opposite sides thereof,
   the marginal edge of the door co-operating with said contact plate and having a groove centrally formed in said frame,
   electrical contact spring fingers secured to said marginal edge in electrical contact with the respective sides of the shielding material on opposite sides of said groove with the free edges of the spring fingers extending into said groove from opposite sides thereof,
   electrical contact means secured to said contact plate in electrically conductive relationship with one of said panels to enter said groove and engage said free edges of the spring fingers in electrically conductive bridging relation in the door closed position,
   electrically conductive means electrically engaging the top and bottom of said shielding material and said panel in sliding relationship,
   a second contact plate secured to the remaining marginal edge of door in relationship electrically bridging said shielding material with a portion of said second contact plate extending past the surface of the door, resilient means carried by one of said panels electrically engaging the second contact plate in door closed position, guide members secured adjacent the upper portion of the door in co-operation with a guide member on the side wall of the room to slidably retain the door in position, a pivotal linkage disposed between said second contact plate and a side wall of the room to hold the door in a forced closed position when in a fully extended position for electrically sealing the periphery of the door under resilient pressure with the side wall when the door is in the closed position.

4. In combination with a plurality of preformed electrically conductive panels forming an electrical isolation room, one side wall of the room having a door opening defined in part by a vertical contact plate, an entrance door slidably retained in the one side wall comprising a rectangular frame and shielding material supported thereon on opposite sides thereof, the marginal edge of the door co-operating with said contact plate and having a groove centrally formed in said frame, electrical contact spring fingers secured to said marginal edge in electrical contact with the respective sides of shielding material on opposite sides of said groove with the free edges of the spring fingers extending into said groove from opposite sides thereof, electrical contact means secured to said contact plate in electrically conductive relationship with one of said panels to enter said groove and engage said free edges of the spring fingers in electrically conductive bridging relation in the door closed position, electrically conductive means electrically engaging the top and bottom of said shielding material and said panel in sliding relationship, a second contact plate secured to the remaining marginal edge of door in relationship electrically bridging said shielding material with a portion of said second contact plate extending past the surface of the door, resilient means carried by one of said panels electrically engaging the second contact plate in door closed position, a pivotal linkage interconnecting said second contact plate with the room to hold the door in a forced closed position when in a fully extended position for and sealing the periphery of the door with the side wall when the door under resilient pressure is in the closed position, an inlet air filter pivotally secured to the side wall in juxtaposition with said linkage to permit access thereto for opening the door from without.

5. In combination with a plurality of preformed electrically conductive panels forming an electrical isolation room, one side wall of the room having a door opening defined in part by a vertical contact plate, an entrance door slidably retained in the one side wall comprising a rectangular frame and shielding material supported thereon on opposite sides thereof, the marginal edge of the door co-operating with said contact plate and having a groove centrally formed in said frame, electrical contact spring fingers secured to said marginal edge in electrical contact with the respective sides of shielding material on opposite sides of said groove with the free edges of the spring fingers extending into said groove from opposite sides thereof, electrical contact means secured to said contact plate in electrically conductive relationship with one of said panels to enter said groove and engage said free edges of the spring fingers in electrically conductive bridging relation in the door closed position, electrically conductive means electrically engaging the top and bottom of said shielding material and said panel in sliding relationship, a second contact plate secured to the remaining marginal edge of door in relationship electrically bridging said shielding material with a portion of said second contact plate extending past the surface of the door, resilient means carried by one of said panels electrically engaging the second contact plate in door closed position, guide members secured adjacent the upper portion of the door in co-operation with a guide member on the side wall of the room to slidably retain the door in position, wheel members secured adjacent the lower portion of the door riding in a slot formed in the floor of the room, a pivotal linkage interconnecting said contact plate with the room to hold the door in a forced closed position when in a fully extended position for electrically sealing the periphery of the door with the side wall when the door is in the closed position, and an inlet air filter pivotally secured to said side wall in juxtaposition with said linkage to permit access thereto for opening the door from without.

References Cited by the Examiner

UNITED STATES PATENTS

| | | | |
|---|---|---|---|
| 2,860,176 | 11/1958 | Lindgren | 174—35 |
| 3,009,984 | 11/1961 | Lindgren | 174—35 |

FOREIGN PATENTS 768,996  2/1957  Great Britain.

ROBERT K. SCHAEFER, *Primary Examiner.*

DARREL L. CLAY, JOHN F. BURNS, *Examiners.*